(12) United States Patent
Jain et al.

(10) Patent No.: US 11,595,498 B2
(45) Date of Patent: Feb. 28, 2023

(54) DATA-DRIVEN ADAPTATION OF COMMUNICATIONS TO INCREASE ENGAGEMENT IN DIGITAL HEALTH APPLICATIONS

(71) Applicant: Vignet Incorporated, Fairfax, VA (US)

(72) Inventors: Praduman Jain, Fairfax, VA (US); Dave Klein, Oakton, VA (US); Yue Cao, Vienna, VA (US); Neeta Jain, Fairfax, VA (US)

(73) Assignee: VigNet Incorporated, Fairfax, VA (US)

( * ) Notice: Subject to any disclaimer, the term of this patent is extended or adjusted under 35 U.S.C. 154(b) by 0 days.

(21) Appl. No.: 17/092,842

(22) Filed: Nov. 9, 2020

(65) Prior Publication Data

US 2021/0058490 A1    Feb. 25, 2021

Related U.S. Application Data

(63) Continuation of application No. 16/120,083, filed on Aug. 31, 2018, now Pat. No. 11,159,643, which is a
(Continued)

(51) Int. Cl.
*H04L 67/63* (2022.01)
*H04L 67/52* (2022.01)
(Continued)

(52) U.S. Cl.
CPC .............. *H04L 67/63* (2022.05); *H04L 67/12* (2013.01); *H04L 67/52* (2022.05); *H04L 67/535* (2022.05)

(58) Field of Classification Search
CPC ........ H04L 67/327; H04L 67/12; H04L 67/22
(Continued)

(56) References Cited

U.S. PATENT DOCUMENTS 8,239,918 B1   8/2012   Cohen
8,566,175 B1   10/2013  Nguyen et al.
(Continued)

OTHER PUBLICATIONS

Final Office Action in U.S. Appl. No. 15/040,635, dated Apr. 13, 2017, 13 pages.
(Continued)

*Primary Examiner* — Tauqir Hussain
(74) *Attorney, Agent, or Firm* — Fish & Richardson P.C.

(57) ABSTRACT

In some implementations, a system adaptively adapts engagement between a user and an application based on prior user interactions and context data associated with the user. A performance category for which performance is tracked for a user of the application is initially identified. Context data indicating a current context of the user is received from a client device associated with the user. One or more responsiveness scores indicating actions of the user with respect to the performance category following the previous communications through the application are determined. A communication is then selected from among communications of multiple types based on the context data for the user and the one or more responsiveness scores for the user. A time to provide the communication to the user is determined based on the context data. The selected communication is provided for output by the client device at the determined time.

21 Claims, 8 Drawing Sheets

Related U.S. Application Data continuation of application No. 15/382,126, filed on Dec. 16, 2016, now Pat. No. 10,069,934.

(51) Int. Cl.
  *H04L 67/50* (2022.01)
  *H04L 67/12* (2022.01)
(58) Field of Classification Search
  USPC .......................................................... 709/224
  See application file for complete search history.

(56) References Cited

U.S. PATENT DOCUMENTS

| | | | |
|---|---|---|---|
| 9,361,011 B1 | 6/2016 | Bums | |
| 9,426,433 B1 | 8/2016 | Mazzarella | |
| 9,461,972 B1 | 10/2016 | Mehta | |
| 9,753,618 B1 | 9/2017 | Jain et al. | |
| 9,753,988 B1 | 9/2017 | McGilliard | |
| 9,848,061 B1 | 12/2017 | Jain et al. | |
| 9,858,063 B2 | 1/2018 | Jain et al. | |
| 9,918,664 B2* | 3/2018 | Blahnik | A61B 5/7435 |
| 9,928,230 B1 | 3/2018 | Jain et al. | |
| 9,983,775 B2 | 5/2018 | Jain et al. | |
| 10,069,934 B2 | 9/2018 | Jain et al. | |
| 10,095,688 B1 | 10/2018 | Jain et al. | |
| 10,241,772 B1* | 3/2019 | Ning | G06F 16/24578 |
| 10,346,900 B1* | 7/2019 | Wilson | G06F 8/38 |
| 10,521,557 B2 | 12/2019 | Jain et al. | |
| 10,565,894 B1 | 2/2020 | Jain et al. | |
| 10,756,957 B2 | 8/2020 | Jain et al. | |
| 10,762,990 B1 | 9/2020 | Jain et al. | |
| 10,776,739 B2* | 9/2020 | Blahnik | G06Q 30/0207 |
| 10,796,549 B2* | 10/2020 | Roberts | H04L 67/12 |
| 10,938,651 B2 | 3/2021 | Jain et al. | |
| 11,056,242 B1 | 7/2021 | Jain et al. | |
| 11,061,798 B1 | 7/2021 | Jain et al. | |
| 11,082,487 B1 | 8/2021 | Jain et al. | |
| 11,102,304 B1 | 8/2021 | Jain et al. | |
| 11,159,643 B2 | 10/2021 | Jain | |
| 2001/0019338 A1 | 9/2001 | Roth | |
| 2002/0022973 A1 | 2/2002 | Sun | |
| 2005/0086587 A1 | 4/2005 | Balz | |
| 2005/0186550 A1 | 8/2005 | Gillani | |
| 2006/0107219 A1 | 5/2006 | Ahya | |
| 2008/0005679 A1 | 1/2008 | Rimas-Ribikauskas | |
| 2008/0127040 A1 | 5/2008 | Barcellona | |
| 2009/0024944 A1 | 1/2009 | Louch | |
| 2009/0043689 A1 | 2/2009 | Yang | |
| 2009/0163182 A1 | 6/2009 | Gatti | |
| 2009/0172002 A1 | 7/2009 | Bathiche | |
| 2010/0041378 A1 | 2/2010 | Aceves | |
| 2010/0235889 A1 | 9/2010 | Chu et al. | |
| 2011/0200979 A1 | 8/2011 | Benson | |
| 2012/0003931 A1* | 1/2012 | Eisinger | H04W 48/08 |
| | | | 455/41.2 |
| 2012/0089521 A1 | 4/2012 | Abrevaya et al. | |
| 2012/0102050 A1 | 4/2012 | Button | |
| 2012/0272156 A1 | 10/2012 | Kerger | |
| 2013/0110565 A1 | 5/2013 | Means | |
| 2013/0145024 A1* | 6/2013 | Cao | H04L 67/22 |
| | | | 709/224 |
| 2013/0166494 A1 | 6/2013 | Davis | |
| 2013/0238686 A1 | 9/2013 | O'Donoghue | |
| 2013/0326375 A1* | 12/2013 | Barak | H04L 51/04 |
| | | | 715/753 |
| 2014/0088995 A1* | 3/2014 | Damani | G16H 20/10 |
| | | | 705/2 |
| 2014/0100883 A1 | 4/2014 | Hamilton | |
| 2014/0156645 A1* | 6/2014 | Brust | H04L 67/22 |
| | | | 707/722 |
| 2014/0156823 A1 | 6/2014 | Liu | |
| 2014/0176955 A1 | 6/2014 | Rao | |
| 2014/0181715 A1 | 6/2014 | Axelrod | |
| 2014/0206391 A1* | 7/2014 | Perotti | G08B 5/226 |
| | | | 455/456.3 |
| 2014/0240122 A1* | 8/2014 | Roberts | G08B 21/182 |
| | | | 340/539.11 |
| 2014/0273913 A1 | 9/2014 | Michel | |
| 2014/0344208 A1* | 11/2014 | Ghasemzadeh | G16Z 99/00 |
| | | | 706/52 |
| 2015/0088955 A1* | 3/2015 | Hendrick | G06F 16/24578 |
| | | | 709/201 |
| 2015/0106369 A1 | 4/2015 | Nolan et al. | |
| 2015/0120846 A1* | 4/2015 | Volach | H04W 24/02 |
| | | | 709/206 |
| 2015/0135160 A1 | 5/2015 | Gauvin | |
| 2015/0148061 A1* | 5/2015 | Koukoumidis | H04W 4/022 |
| | | | 455/456.1 |
| 2015/0182861 A1* | 7/2015 | Winter | H04N 21/2743 |
| | | | 463/31 |
| 2015/0256689 A1* | 9/2015 | Erkkila | H04N 9/8045 |
| | | | 386/228 |
| 2016/0058287 A1 | 3/2016 | Dyell | |
| 2016/0147955 A1* | 5/2016 | Shah | G16H 40/20 |
| | | | 705/2 |
| 2016/0165409 A1* | 6/2016 | Bulut | H04W 4/06 |
| | | | 715/734 |
| 2016/0209920 A1* | 7/2016 | Mastandrea | G06F 3/014 |
| 2016/0261528 A1* | 9/2016 | Blahnik | A61B 5/1118 |
| 2016/0300570 A1 | 10/2016 | Gustafson et al. | |
| 2016/0359880 A1* | 12/2016 | Pang | G06F 21/566 |
| 2016/0359915 A1* | 12/2016 | Gupta | H04L 63/1416 |
| 2017/0034649 A1* | 2/2017 | Dotan-Cohen | H04M 1/72454 |
| 2017/0118159 A1* | 4/2017 | Ratiu | H04L 67/22 |
| 2017/0181698 A1* | 6/2017 | Wiedenhoefer | A61B 1/041 |
| 2017/0257450 A1 | 9/2017 | Rao | |
| 2017/0300538 A1* | 10/2017 | Seuss | G06F 16/2272 |
| 2018/0060500 A1* | 3/2018 | Ni | G16H 20/30 |
| 2018/0176331 A1 | 6/2018 | Jain et al. | |
| 2018/0350451 A1* | 12/2018 | Ohnemus | G06Q 30/0236 |
| 2019/0068753 A1 | 2/2019 | Jain et al. | |
| 2020/0131581 A1 | 4/2020 | Jain et al. | |

OTHER PUBLICATIONS

Final Office Action in U.S. Appl. No. 15/152,411, dated Mar. 17, 2017, 17 pages.
Final Office Action in U.S. Appl. No. 16/120,083, dated Jan. 13, 2021, 17 pages.
http://www.khanacademic.org, 2017, 1 page.
Non-Final Office Action in U.S. Appl. No. 15/040,635, dated Dec. 30, 2016, 11 pages.
Non-Final Office Action in U.S. Appl. No. 15/040,635, dated Jul. 8, 2016, 9 pages.
Non-Final Office Action in U.S. Appl. No. 15/067,046, dated Nov. 1, 2016, 19 pages.
Non-Final Office Action in U.S. Appl. No. 15/152,411, dated Dec. 7, 2016, 10 pages.
Non-Final Office Action in U.S. Appl. No. 15/279,845, dated Apr. 21, 2017, 10 pages.
Non-Final Office Action in U.S. Appl. No. 15/337,222, dated Mar. 23, 2017, 13 pages.
Non-Final Office Action in U.S. Appl. No. 15/382,126, dated Mar. 17, 2017, 16 pages.

* cited by examiner

USER: 36 YEAR OLD WOMAN; NO HISTORY OF PERFORMANCE RUNNING

PROGRAM: MARATHON PREPARATION

PERFORMANCE CATEGORY: INCREASE USER'S PROGRAM ADHERENCE

PRIOR PERFORMANCE: +15 MIN OVER TARGET PERFORMANCE; SENSOR DATA INDICATING REPEATED STOPPING

TIME: 2 DAYS INTO PROGRAM

PRIOR PERFORMANCE: -5 MIN OVER TARGET PERFORMANCE; SENSOR DATA INDICATING EXCEPTIONAL PERFORMANCE

TIME: 3 WEEKS INTO PROGRAM

PRIOR PERFORMANCE: NO EXERCISE IN LAST 2 WEEKS; LIMITED INTERACTION ON APPLICATION

TIME: 3 MONTHS INTO PROGRAM

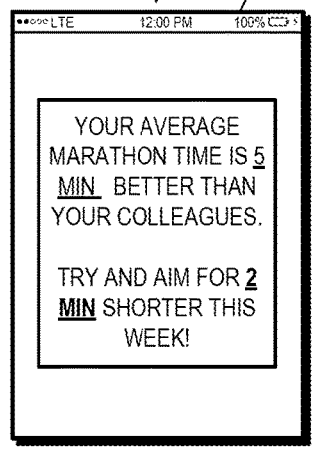
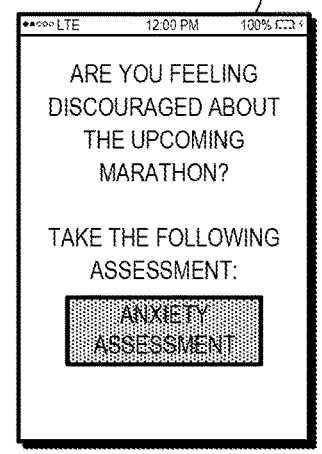

410a — WATCH THIS VIDEO ABOUT BEST RUNNING TECHNIQUES:

410b — YOUR AVERAGE MARATHON TIME IS 5 MIN BETTER THAN YOUR COLLEAGUES. TRY AND AIM FOR 2 MIN SHORTER THIS WEEK!

410c — ARE YOU FEELING DISCOURAGED ABOUT THE UPCOMING MARATHON? TAKE THE FOLLOWING ASSESSMENT: ANXIETY ASSESSMENT

CONTENT TYPE: VIDEO
COMMUNICATION TYPE: ENCOURAGEMENT

CONTENT TYPE: TEXT MESSAGE
COMMUNICATION TYPE: USER CHALLENGE

CONTENT TYPE: USER SURVEY
COMMUNICATION TYPE: REASSURANCE / USER EVALUATION

FIG. 4

DATA-DRIVEN ADAPTATION OF COMMUNICATIONS TO INCREASE ENGAGEMENT IN DIGITAL HEALTH APPLICATIONS

CROSS-REFERENCE TO RELATED APPLICATIONS

This application is a continuation of U.S. application Ser. No. 16/120,083, filed Aug. 31, 2018, now U.S. Pat. No. 11,159,643, which is a continuation of U.S. application Ser. No. 15/382,126, filed Dec. 16, 2016, now U.S. Pat. No. 10,069,934, all of which are hereby incorporated by reference in their entirety.

GOVERNMENT LICENSE RIGHTS

This invention was made with government support under grant number HHSN261201300056C awarded by the National Institutes of Health. The government has certain rights in the invention.

This specification generally describes technology related to applications for computing devices.

FIELD

This specification generally describes technology related to applications for computing devices.

BACKGROUND

Applications for computers, mobile devices, and other devices can provide useful functionality to users. Users generally install and run many different applications, each with a different purpose and set of functionality. Frequently, applications are coded and maintained separately, at considerable effort and cost. Applications are often individually stored and distributed through application store or marketplace, requiring significant server resources for distribution and storage. Further, user devices have limited storage space. This limited space is often consumed by applications that are each useful for only limited functions, or by applications that each only partially serve the user's needs. Many applications are updated only occasionally, with software updates that users may need to install manually.

SUMMARY

Applications are often unable to enable maintain consistent and meaningful engagement with users. For instance, users often use an application frequently when it is new, then reduce or discontinue use over time. In the case of healthcare support applications, failing to use an application can be detrimental to the user, since the user may fail to reach his potential for physical and mental wellbeing.

In some implementations, a system is capable of improving engagement with an application by individually personalizing the communication between the application and each user. For example, the application, and an associated server system, can implicitly learn a user's preferences for engagement through user responses to messages periodically sent to the user on the application. Additionally, the system can determine which types of communications and timing are most effective in supporting the user in achieving appropriate performance targets.

For example, different users can respond differently to communications. Some users respond well to a single reminder for taking medicine, given at the time the medication is needed. However, other users respond better to a reminder at the beginning of the day, or a reminder thirty minutes beforehand, or a reminder in a particular location. As another example, some users respond to a direct instruction, while others respond to a more indirect communication, such as praise for taking the medication the day before. The system can start with a set of standard reminders, and adjust the timing and type of interactions with the user based on the user's performance with respect to certain metrics.

To individually personalize the communications with the application, the system initially determines how different aspects of communication affect a specific user's performance on the application with respect to a set of performance categories. For example, such performance categories can include the level of user interactivity on the application (e.g., number and type of user responses after receiving communications), adherence to specified program criteria (e.g., taking medications as instructed in accordance with a treatment plan), or patterns of passively determined user behaviors that indicate engagement or lack of engagement (e.g., consistency of periodic user input that reflects a user's participation), among others. Measurements relating to the user's performance with respect to such performance categories are then used to determine a user's preferences for receiving information. This enables the system to determine the type of content to send to the user during specific circumstances, and an optimal time period in which to send the content responsive to a particular user context.

The system utilizes the user's preferences to provide specific communications that are responsive to a particular user context and targeted to improve the engagement of the user on the application. For example, the system may receive context data indicating a particular location associated with the user, prior applications used by the user, or other types of information indicating external circumstances beyond the user's activity on the application. The system then determines a set of responsiveness scores indicating a respective likelihood that a particular communication type and/or content type will improve the user's engagement in the application with respect to a particular performance category.

As an example, a performance category can be to improve the user's adherence to a user-defined fitness goal by engaging the user to participate in specified fitness exercises. In response to receiving context data indicating the location of the user, current activity of the user and the user's current performance relative to the fitness goal, the system can transmit different types of communication that engage the user in different ways based on the user's current context. For instance, if the user's current context indicates that he/she has limited availability to interact with the application and that his/her performance is below the specified fitness goal for a specified period of time, the system sends a text-based message to encourage the user to improve performance to adhere to the goal. In another instance, if the user's current context indicates that he/she has greater ability to interact with the application, the system may instead send a video message that is directed to improving user performance. In these two scenarios, the user's availability to interact is used to compute respective responsiveness scores associated with each type of content (e.g., text or audio content), and automatically send the most appropriate content indicated by the values associated with the respective responsiveness scores.

Additional advantages result from the ability to eliminate unnecessary interactions that are not likely to assist the user.

By eliminating these unhelpful outputs, the system conserves battery power, processing cycles, and network bandwidth.

The details of one or more implementations are set forth in the accompanying drawings and the description below. Other potential features and advantages will become apparent from the description, the drawings, and the claims.

BRIEF DESCRIPTION OF THE DRAWINGS

FIG. 4 is a diagram that illustrates examples of different communications that are provided in response to user actions on an application.

In the drawings, like reference numbers represent corresponding parts throughout.

DETAILED DESCRIPTION

In general, a system is capable of improving user engagement with an application by individually personalizing the communication between the application and each user. For example, the application, and an associated server system, can implicitly learn a user's preferences for engagement through user responses periodically sent to the user on the application. Additionally, the system can determine which types of communications and timing are most effective in supporting the user in achieving appropriate performance targets.

As described throughout, "user engagement" refers generally to user's activity on the application. In some instances, "user engagement" refers to the input received on the application that is related to user activity on the application (e.g., user input provided on an application interface, or sensor data associated with user activity). In other instances, "user engagement" refers to the user's performance on a program that is provided on the application. The user's performance can be measured relative to a set of program criteria that describes the objective or purpose of the program (e.g., physical activity goals, lowering cholesterol). In this regard, the system can measure "user engagement" in order to identify communications to both improve a user's interactions on the application (e.g., number of user inputs provided on the application) and improve the user's performance on a program provided on the application.

As described, "performance category" refers to a particular aspect of user activity on the application that is evaluated by the system in order to improve user engagement on the application. As an example, a performance category can represent goal adherence, where the system monitors user input data received on the application (e.g., a manual input indicating user cholesterol level), and compares the user input data relative to a particular performance goal (e.g., target cholesterol level). In this example, the comparison is used to adaptively adjust communications to maximize the user's ability to achieve the performance goal (e.g., through different types of communications that suggest different user behaviors directed towards goal adherence). As another example, a performance category can also represent a level of user interactivity, where the system monitors the number of user interactions on the application over a specified period of time. In this example, the number and regularity of user interactions on the application can be used to determine user interactivity on the application. The system can then adaptively determine, based prior user interactions on the application, the user's preferences for certain communications in relation to specific user contexts. The system then adjusts the communications provided on the application based on the user's present context in order to improve user interactivity on the application.

Figure 1A:
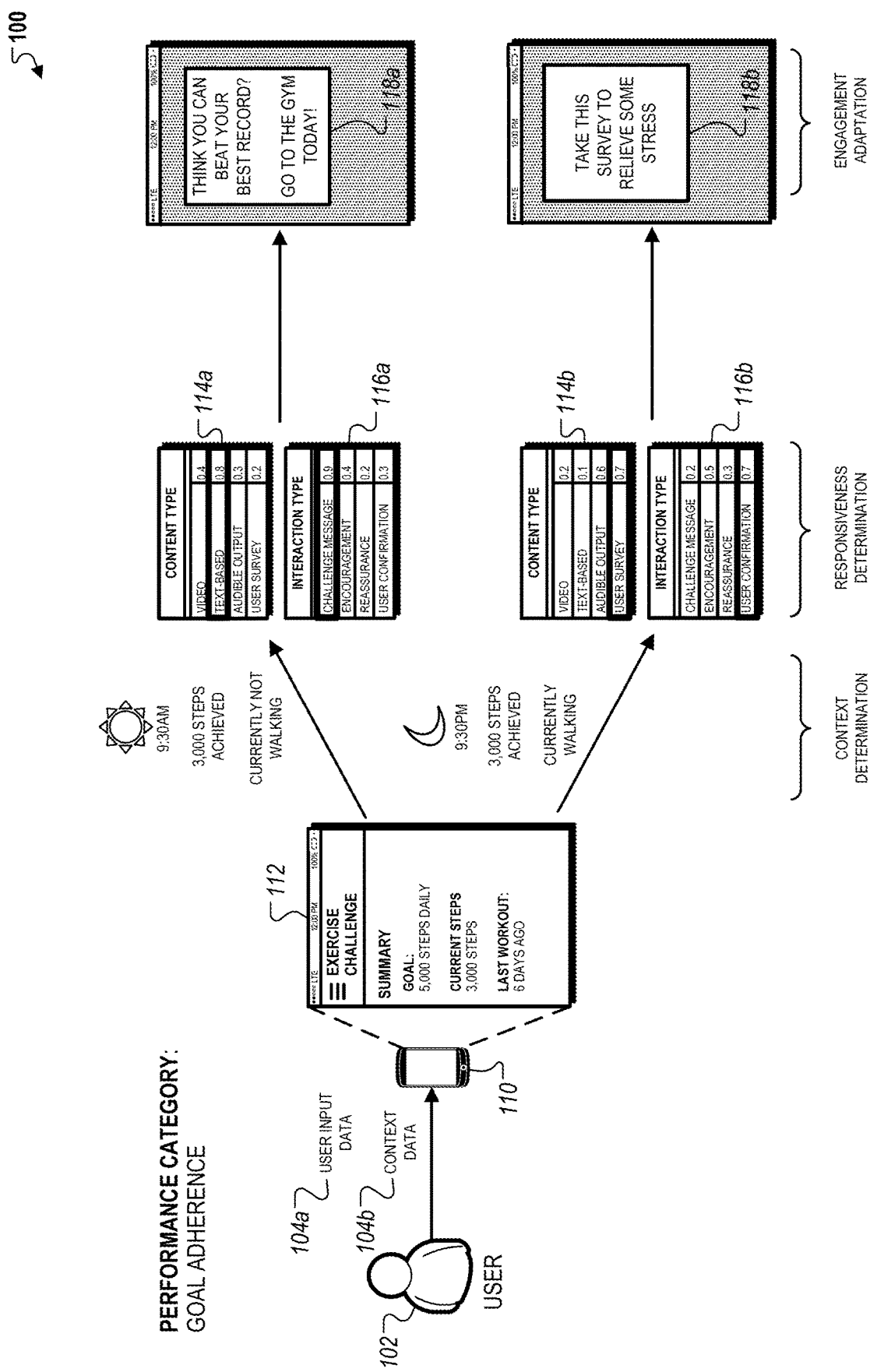
FIG. 1A is a diagram that illustrates examples of different context-based engagement adaptations for a performance category.

FIG. 1A is a diagram that illustrates examples of different context-based engagement adaptations for a performance category. In the example, a user 102 participates in an exercise challenge program through an application 112 that runs on a client device 110. The exercise challenge program allows the user 102 to set a performance goal (e.g., 5,000 steps daily). The measured user performance, based on the user interactions on the application 112, are then compared to the performance goal. This comparison is used to adaptively improve user engagement on the application to improve goal adherence based on the user's present context.

The client device 110 initially receives user input data 104a from a user 102, and context data 104b associated with the user input data 104a. The user input data 104a can include manual input provided by the user on an application interface, or sensor data that is associated with user activity related to the application. The context data 104b can include various types of data indicating a present context of the user 102 (e.g., user location, time of day, prior user activity on other applications on the client device 110, etc.). In the example, the user input data 104a specifies a number of steps achieved by the user 102, and the context data 104b indicates a time of day and present user activity at the time when the user input data 104a is received by the client device 110.

Upon receiving the user input data 104a and the context data 104b, the application 112 updates the performance tracking data associated with the exercise challenge. For example, the application 112 provides a summary that specifies the target performance goal of 5,000 daily steps, a present user performance indicating 3,000 steps achieved for the present day, and the last identified workout for the user.

The system then adaptively adjusts the user engagement based on the present context indicated by the context data 104b. This is accomplished by initially performing a context determination to identify the present context associated with the user 102, determining a set of responsiveness scores that indicate respective likelihoods of the user 102 responding to a type of content provided and a type of interaction included within a communication, and then providing a specific communication based on the values of the responsiveness scores. In the examples depicted in FIG. 1, different communications 118a and 118b are provided to the user based on the different present contexts identified for the user 102.

In the first instance, the system initially determines that the context data 104b indicates that the time of day is morning (e.g., 9:30 AM), the user performance is below the target performance (e.g., 3,000 steps achieved with a goal of 5,000 daily steps), and that the user is not presently walking. The system then computes a set of respective responsiveness scores for a type of content and a type of interaction to be included within a subsequent communication, which are specified by the tables 114a and 116a, respectively.

The table 114a specifies that the responsiveness score is the greatest for text-based content based on determining that the time of day specified by the context data 104b indicates that the attention of the user 102 may be occupied because he/she may presently be travelling to work. In calculating the responsiveness scores, the system may also consider prior user activity or user interactions at the time of day specified by the context data 104b. Therefore, because text-based content is the least intrusive compared to the other types of content included within the table 114a (e.g., video content, audible output, user survey), the system calculates the highest responsiveness score for text-based content.

In addition, the table 116a specifies that the responsiveness score is the greatest for a challenge message based on determining that that user's current performance, in relation to the early time of day, indicates that the user is likely to exceed the daily target goal. In addition, because the context data 104b indicates that the user 102 is not presently walking, the system may determine a communication may be necessary to motivate the user to continue walking throughout the day. In calculating the responsiveness scores, the system considers the type of user interaction that is likely to improve user activity. Therefore, because the present user performance indicates that the user has outperformed the performance goal for the time of day, the challenge message is determined to have the highest responsiveness score.

The system then provides the communication 118a for output on the application 112. As depicted, the communication 118a is a text-based challenge message that is targeted to motivate the user 102 to go to the gym later in the day in order to exceed the target performance goal. As described above, the communication 118a is generated based on the highest responsiveness scores indicated by the tables 114a and 116a.

Referring now to the second instance, the system initially determines that the context data 104b indicates that the time of day is night (e.g., 9:30 PM), the user performance is below the target performance (e.g., 3,000 steps achieved with a goal of 5,000 daily steps), and that the user is presently walking. The system then computes a set of respective responsiveness scores for a type of content and a type of interaction to be included within a subsequent communication, which are specified by the tables 114b and 116b, respectively.

Compared to the first instance, the table 114b instead specifies that the responsiveness score is the greatest for a user survey based on determining that the time of day specified by the context data 102 and the user activity level indicates that the user 102 may be tired and/or exhausted from a long day. In this situation, the system determines that the user is highly unlikely to achieve the performance goal for the program. In addition, because of present user activity indicating that the user is presently walking, the system may determine that the user may be trying to superficially accomplish the target goal, which may potentially cause detrimental impacts to his/her mental well-being. Therefore, the user survey is determined to have the highest responsiveness score within the table 114b to prepare the user to improve performance the following day.

In addition, the table 116b specifies that the responsiveness score is the greatest for a user confirmation based on determining that the user's performance for the present day is deficient in relation to the performance goal for the program. In addition, because the user has not worked out in the last six days, the system determines that the user's interaction level on has fallen below a threshold level and a user confirmation may be necessary to re-evaluate the user's fitness goals and/or expectations from participating in the exercise challenge program.

The system then provides the communication 118b for output on the application 112. As depicted, the communication 118b is a request for the user to particulate in a stress relieving survey. The survey requests the user to answer questions related to his/her performance on the exercise challenge program, whether he/she has faced any anxiety or stress during participation in the program, and/or other information. As described above, the questions or information included within survey is based on the responsiveness scores indicated by the tables 114b and 116b.

In the two instances described in FIG. 1A, the system utilizes the context data 104b indicating a present user context of the user 102 and data related to the user's prior interactions on the application 112, to determine the most appropriate communication to send to the user 102 in order to improve and/or maximize goal adherence. In this regard, the selected performance category (e.g., goal adherence) is used to calculate values of the responsiveness scores for content type and interaction type to improve the user's performance with respect to the particular performance category.

Figure 1B:
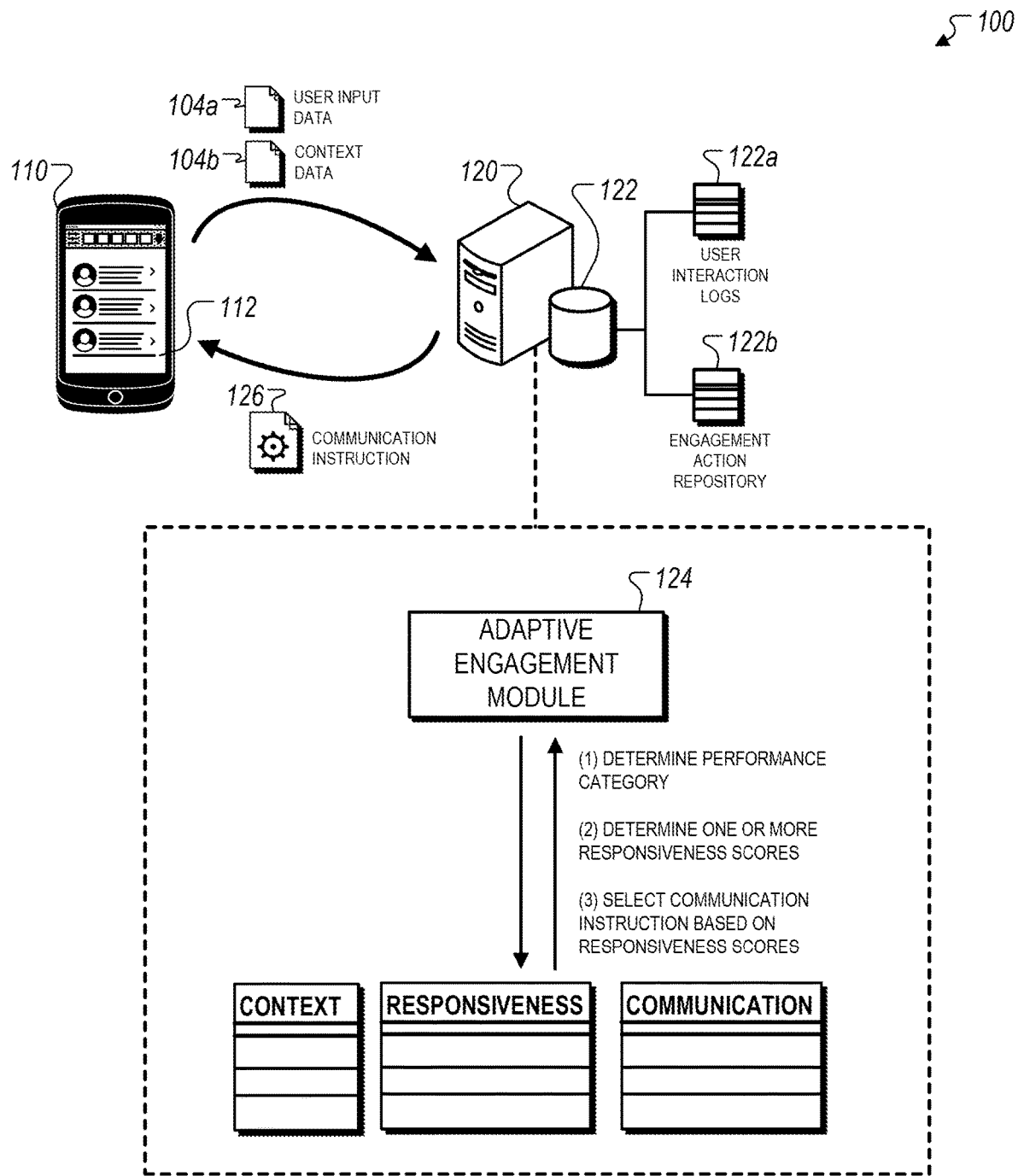
FIG. 1B is a diagram that illustrates an example of a system that is capable of adaptively performing personalized engagement.

FIG. 1B is a diagram that illustrates an example of a system 100 that is capable of adaptively adjusting user engagement on an application. The system 100 generally includes the client device 110 and a remote server 120, which exchange communications over a network. The server 120 includes a database 122 that stores user interaction logs 122a and engagement action repository 122b. The server 120 further includes an adaptive engagement module 124 that determines the most appropriate communication to provide to the client device 110.

In general, during an engagement adaptation process, the client device 110 initially transmits the user input data 104a and the context data 104b to the server 120. The adaptive engagement module 124 then identifies an applicable performance category to evaluate the received data, determines one or more responsiveness scores based on the received data, and then selects a communication instruction based on the values of the one or more responsiveness scores. The adaptive engagement module 124 uses a rule engine analyzes a set of rules that are each specified by associated conditions, triggers, and system actions. The server 120 then generates a communication instruction 126 that includes the communication selected by the adaptive engagement module 124, and transmits the communication instruction 126 for output on the client device 110.

The client device 110 can be any type of electronic computing device that is capable of executing an application and providing a user interface. For instance, although the client device 110 is depicted as a smartphone, in some implementations, the client device 110 may be a tablet computing device, a laptop computing device, a desktop computing device, or a wearable device (e.g., a smart watch, smart classes, a bracelet, etc.). In addition, the user interface provided on the client device 110 may be outputted through a visual display, but may additionally or alternatively provide information through, for example, audio output, haptic outputs, and electroshock which may be dynamically configured based on information about the user.

The server 120 can be any type of remote electronic computing device that is capable of exchanging data transmissions with the client device 110 over a network. The server 120 stores data received from the client device 110 (e.g., the user input data 104a and the context data 104b) in the database 122. For example, after each data transmission between the client device 110 and the server 120, the data received by the server 120 may be stored in the database 122 as historical data stored included within the user interaction logs 122a. This data can then be used in selecting the most appropriate communication in a subsequent adaptive engagement adjustment operation.

The user interaction logs 122a include historical data related to user activity and/or performance on the application 112. For example, the user interaction logs 122a can include mappings between a prior user context, a prior communication provided to the user, and a user's prior response to the communication. The user interaction logs 122a can also include prior responsiveness score calculations made by the adaptive engagement module 124. In this regard, the user interaction logs 122a enable the adaptive engagement module 124 to utilize historical information associated with the user to make personalized adjustments in communication that are likely to increase the response of the user when he/she is associated with a particular context. In addition, because the user interaction logs 122a are periodically updated with each data transmission, the data included within the user interaction logs 122a can be used to slowly adapt the communications to the inherent preferences of the user.

The engagement action repository 122b includes a list of prior communications that were provided to the user in a prior engagement adjustment operation. For instance, the engagement action repository 122b can specify a prior context associated with the user 102, the respective responsiveness scores predicted for the user 102 given the prior context, and the selected communication that was provided to the user 102. In this regard, during a subsequent engagement adjustment operation, the data included within the engagement action repository 122b can be used to provide a user 102 with a similar communication if the user's present context is determined to be similar to a prior context that is associated with a previously submitted communication. For example, the data included within engagement action repository 122b can be used to transmit quick-response communications that are associated with a set of predetermined reoccurring contexts for the user (e.g., when the user is at work, when the user is at home, etc.).

The adaptive engagement module 124 may be a software module that selects a communication to be included within the communication instruction 126 based on comparing the user input data 104a and the context data 104b received from the client device 110 to the data stored on the database 122 (e.g., the user interaction logs 122a, the engagement action repository 122b). In some instances, the adaptive engagement module 124 selects an appropriate communication based on comparing the present user context indicated by the context data 104b to prior user contexts included within the user interaction logs 122a, and selects an appropriate communication for output from the engagement action repository 122b. The adaptive engagement module 124 is described more particularly below with respect to FIG. 2.

While the example of FIG. 1B shows the client device 110 communicating with the server 120 to obtain a communication instruction, in some implementations, a user device such as the client device 110 can generate and provide communications as discussed herein independently. For example, in some implementations a user device receives context data, determines responsiveness scores, and then selects and provides communications at an appropriate time without an instruction from a server. Indeed, the user device may locally store software that provides the algorithm for generating responsiveness scores and generating appropriate communications. This software may be part of an application, application module, or Internet resource downloaded by the user device. Similarly, the user device may store a history of user interactions (e.g., with the user device or with another device) or other data used to generate the responsiveness scores. Thus, a user device may perform the techniques discussed herein, and communication with a server system may be optional in such implementations.

Figure 2:
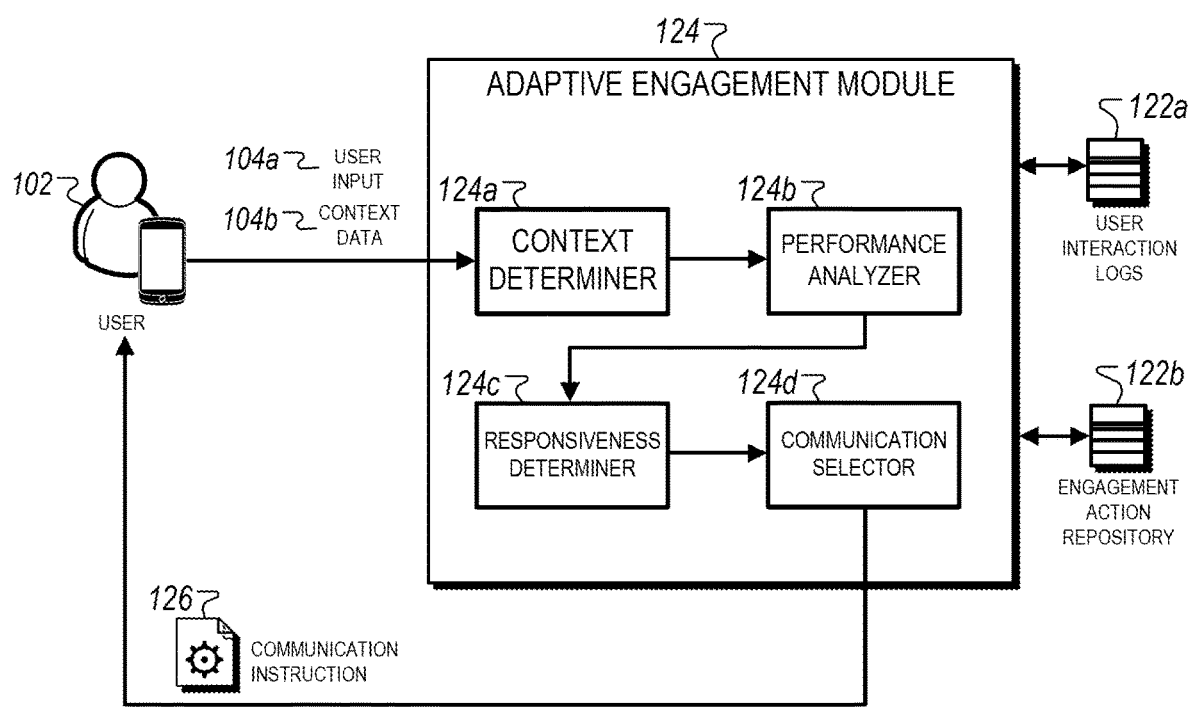
FIG. 2 is a diagram of an example of an adaptive engagement module.

FIG. 2 is a diagram of an example of an adaptive engagement module 124. The adaptive engagement module 124 includes a context determiner 124a, a performance analyzer 124b, a responsiveness determiner 124c, and a communication module 124d. As described above, the adaptive engagement module 124 processes the user input data 104a and the context data 104b associated with the user 102 in order to generate and output the communication instruction 126 that used to adjust the user engagement on the application 112 with respect to a particular performance category.

The context determiner 124a initially predicts a current context of the user 102 indicated by the context data 104b. For example, as described previously with respect to FIG. 1, the context data 104b can include location information associated with the client device 110, user activity on applications besides the application 112 (e.g., web search data, prior voice and text queries, etc.), and/or sensor data indicating a current user activity.

The context determiner 124a predicts a current context of the user 102 by comparing the information included within the context data 104d to the information included within the user interaction logs 122a. For example, in some instances, the context determiner 124a predicts a current context of the user 102 based on identifying similarities to information related to a prior context of the user 102. In this regard, historical context data included within the user interaction logs 122a is used to identify the current context of the user 102. In other instances, the context determiner 124a may use various clustering techniques to determine a current context of the user 102 based on identifying similarities to context data associated with other users within a cluster of users. In such instances, the cluster includes the user 102 and other users that are determined to be similar to the user 102 (e.g., users that are enrolled in the same program, or users within the same demographic).

After predicting the current context of the user 102, the performance analyzer 124b determines a performance category to evaluate the received user input data 104a associated with the current context of the user 102. In some instances, the performance category may be determined based on performance criteria associated with a program provided on the application 112. For instance, in the example depicted in FIG. 1, the selected program category (e.g., goal adherence) is based on the exercise challenge program being provided on the application 112 since goal adherence has a determinative impact on user performance with respect to the objectives of the program. In other instances, the program category can be selected based on improving particular aspects of the user activity on the application 112 (e.g., increasing the amount and/or regularity of user interaction).

After selecting the program category, the responsiveness determiner 124c computes a set of responsive scores with respect to the selected program category. As described previously with respect to FIG. 1A, the responsiveness scores reflect respective likelihoods that particular types of content and/or particular types of interactions will increase engagement between the user 102 and the application 112.

The respective values of the responsiveness scores are calculated based on prior interactions of the user 102 on the application 112. For instance, the responsiveness determiner 124c accesses the user interaction logs 122a to determine how the user 102 has responded to the particular types of content and/or the particular types of interaction when user 102 was in a prior context that is similar to the current context predicted by the context determiner 124a. In other instances, the user interaction logs 122a may specify a set of general user preferences, which are then used to up-weight or down-weight the computed responsiveness scores for different types of content and the different types of interactions. In such instances, the user 102 may indicate user preferences during a program enrollment process, which is then used to adjust the calculation of the responsiveness scores.

The communication selector 124d then selects an appropriate communication from among communications of different types based on the values of the responsiveness scores. For instance, the communication selector 124d identifies the particular content type and the interaction type with the greatest responsiveness score, and then selects a communication that is associated with the identified content type and interaction type. In some implementations, this is accomplished by selecting a communication from a list of predetermined communications that are included within the engagement action repository 122b, which specifies a content and interaction classification for each communication within the list. In such implementations, the communication selected uses the content type and interaction type to filter the list of predetermined communications and ultimately selects the appropriate communication based on additional information (e.g., type of input specified by the user input data 104a, the user's progress within the program, among others).

Alternatively, in other implementations, the communication selector 124d dynamically generates a communication by using the responsiveness scores as building blocks for data and/or information to include within the generated communication. For example, the responsiveness score for the content type can be used to identify the most applicable stored content in the database 112, whereas the responsiveness score for the interaction type can be used to generate a format for presenting the stored content. In such implementations, after the communication selector 124d dynamically generates the communication, the generated communication is then added to the engagement action repository 122b.

The communication selected and/or generated by the communications selector 124d is then packaged into the communication instruction 126. The adaptive engagement module 124 then determines an appropriate time to transmit the communication instruction 126 to the client device 110. The time to transmit the communication may be determined based on the current context of the user 102. For example, if the current context indicates that user 102 is presently occupied, the adaptive engagement module 124 may wait to transmit the communication instruction 126 at a later time when the user 102 is available. In another example, if the communication instruction 126 includes a context-specific communication, then the adaptive engagement module 124 may transmit the communication instruction 126 when the user 102 is determined to be in the particular context associated with the context-specific communication.

In some implementations, the adaptive engagement module 124 uses a rule-based decision engine to select a communication to provide a user in response to receiving the user input data 104a and the user context data 104b. For instance, each rule may associate one or more triggers, one or more evaluation conditions, and one or more corresponding communications to provide in response to a satisfaction of at least one of the one or more triggers and/or evaluation conditions. The rules may have varying scopes and hierarchies. For example, some rules can be associated with a reoccurring context as a trigger and used to specify the output of a general communication when the user is determined within the reoccurring context (e.g., providing a general reminder to work out when the user arrives home from work). These rules are associated with multiple programs that are provided on the application 112. Alternatively, other rules can be program-specific and associated with a program-specific program metric as an evaluation condition. These rules are used to enable the output of tailored communications used to specifically improve user engagement with respect to a particular program-specific performance category (e.g., improving the number of daily calories burned).

Figure 3A:
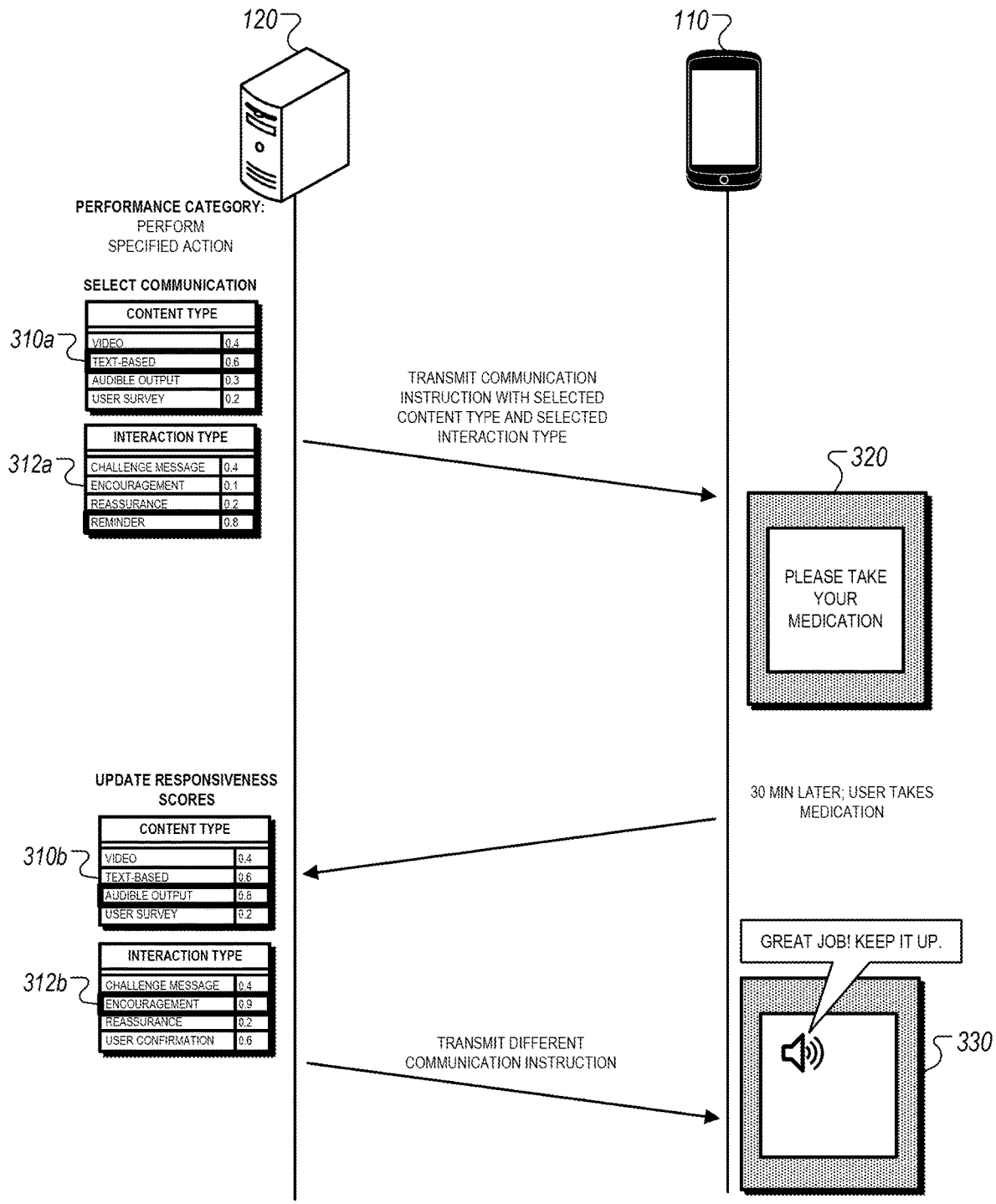
FIG. 3A is a diagram that illustrates an example of a set of interactions for adaptively transmitting communications to a client device.

FIG. 3A is a diagram that illustrates an example of a set of interactions for adaptively transmitting communications between the server 120 and the client device 110. In the example, the server 120 transmits communications related to a long-term treatment adherence program. In this example, the system adjusts the user engagement in order to improve a user's compliance with the treatment criteria such as, for example, taking a prescribed medication according to a predetermined schedule.

The adaptive engagement module 124 of the server 120 initially determines that the performance category is for the user to perform a specified action (e.g., take a prescribed medication associated with the treatment adherence program). The adaptive engagement module 124 then computes a set of responsiveness scores for the specified performance category using the techniques described above.

As depicted, the tables 310a and 312a specify a set of respective responsiveness scores that are computed for different types of content and different types of interaction. The adaptive engagement module 124 then selects a text-based reminder for output based on the highest values indicated by the tables 310a and 312b and transmits a selected communication 320 to the client device 110. The selected communication 320 is provided for output on the application 112 in order to remind the user to take a medication.

Once the user provides a user input indicating that he/she has taken the medication (e.g., through a manual input on the application 112), the adaptive engagement module 124 then re-calculates the previously calculated responsiveness scores in review of the recently received user input data. For instance, the updated responsiveness scores within the tables 310b and 312b reflect higher scores for audible input and encouragement relative to the scores within the tables 310a and 312a. This increase reflects a change in user performance because the user has performed the action that is indicated by the performance category (e.g., taking the prescribed medicine).

In the example, the adaptive engagement module 124 determines that an audible output that provides encouragement to the user 102 for taking the prescribed medication will improve subsequent user participation in the treatment adherence program. The adaptive engagement module then transmits a different communication instruction that includes the communication 330 for output to the client device 110.

Figure 3B:
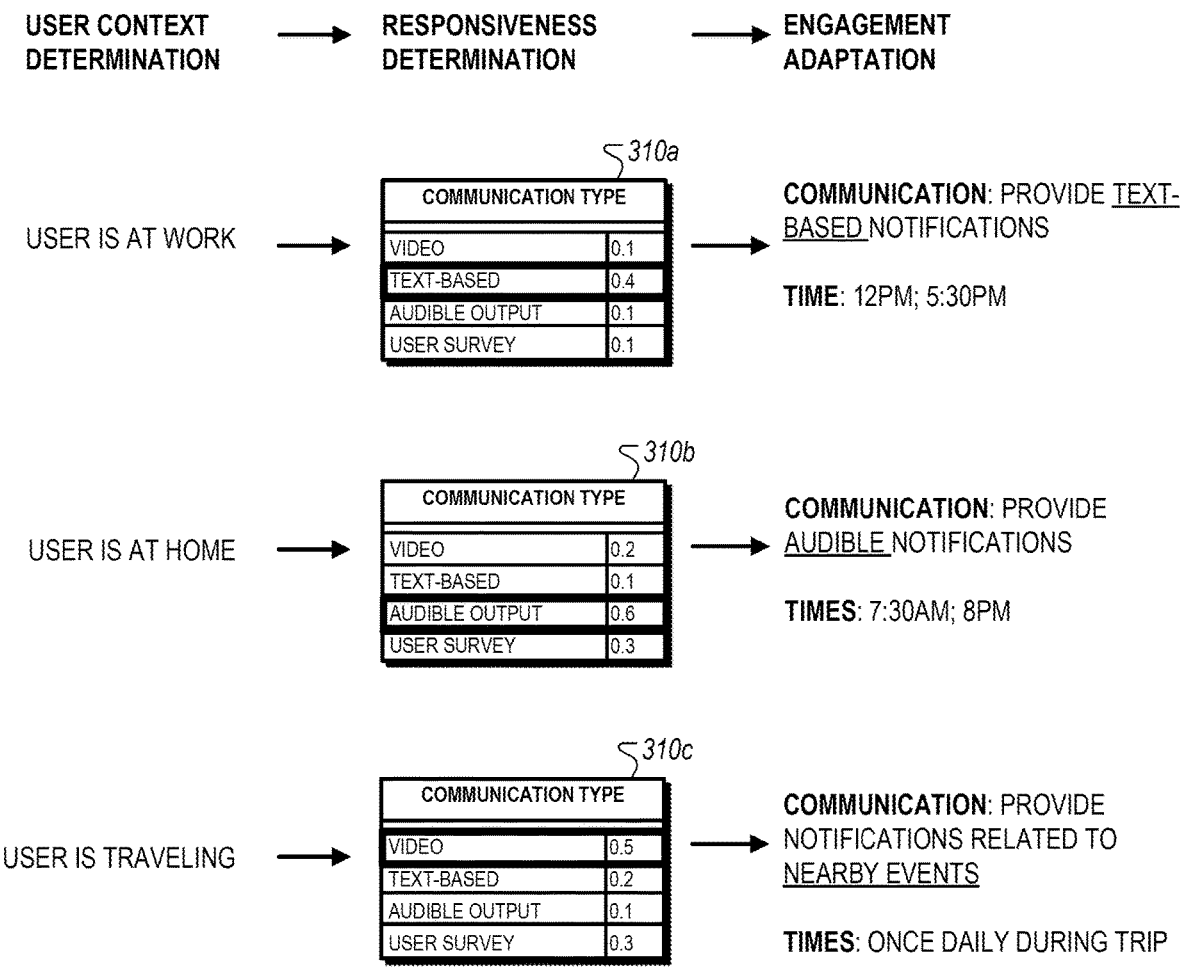
FIG. 3B is a diagram that illustrates examples of context-specific engagement adaptations.

FIG. 3B is a diagram that illustrates examples of context-specific engagement adaptations. In the examples depicted, the engagement adaptation performed by the system is varied based on the particular context for the user 102.

As described above, the adaptive engagement module 124 initially performs a context determination to identify a current context of the user 102. The adaptive engagement module 124 then predicts the responsiveness of the user 102 to different communications with respect to the determined context, and finally selects the appropriate communication to provide for output during an adaptive engagement adjustment operation.

In the first example, the current context of the user 102 indicates that he/she is presently at work. As described above, this may be determined based on, for example, location data associated with the client device 110, user activity on applications on the client device 110, or information from user data stored on the client device 110. In this context, the system determines that the user's ability to interact on the application 112 may be limited to non-intrusive communications, and in response, computes a set of responsiveness scores in table 310a that reflects the user's ability to respond to each type of communication. As depicted, the text-based communication type is determined to have the highest responsiveness score because it is the least intrusive.

The adaptive engagement module 124 also determines times to provide the communication based on the current context associated with the user 102. For example, the adaptive engagement module 124 determines that 12 PM and 5:30 PM are appropriate times to provide the selected communication because these times are associated with lunch break and when the user 102 is finished with work. These times are selected based determining that the user 102 has greater availability to interact on the application 112 while he/she is presently the current context. The adaptive engagement module 124 then provides a text-based notification based on determining that the responsiveness score for text-based communications has the highest value.

In the second example, the current context of the user 102 indicates that he/she is presently at home. In this context, the system determines that the user's ability to interact on the application 112 may be greater than other contexts (e.g., being at work), including more interactive forms of communication. Thus, in this example, the adaptive engagement module 124 computes a set of responsiveness scores in table 310b based on the communication and interaction preferences of the user based on the user's responsiveness to prior communications. As depicted, the audible output communication type is determined to have the highest responsiveness score because the user prefers audible output compared to other communication types. The adaptive engagement module 124 then selects 7:30 AM and 8:00 PM as the times to send the communication based on determining that these are times when the user is likely to be home.

In the third example, the current context of the user 102 indicates that he/she is traveling and not presently located near frequent locations such as home or work. In this context, the system determines that the user's focus and/or attention may be directed to information that is related to the travel location. Thus, in this example, the adaptive engagement module 124 computes a set of responsiveness scores in table 310c based on the types of content that are more likely to provide the user 102 with a greater amount of information related to the travel location. As depicted, the video content is determined to have the highest responsiveness score because the user is more likely to take in interest in videos related to nearby events of the travel location. In addition, the adaptive engagement module 124 provides a daily update during the trip because the user 102 is likely to have limited availability compared to normal situations when the user is not traveling.

FIG. 4 is a diagram that illustrates examples of different communications that are provided in response to user actions on an application. As depicted, the communications 410a, 410b, and 410c represent alternative communications that can be presented to a user enrolled within a program available on the application 112. The adaptive engagement module 124 selects the particular communication to provide based on a combination of the prior performance of the user and the length of time the user has been enrolled into the program.

In the example, the user is a middle-aged woman that participates in a marathon preparation program that provides guidance on training exercises and best practices to prepare for a novice runner to run a marathon. The program is intended to be interactive and providing training exercises for the user with a set of associated performance targets. In this regard, the program periodically measures the user's running performance and compares the measured performance to a set of predetermined performance targets to determine if the user's performance is progressing according a set of program goals. This can be measured in, for example, the time that it takes the user to finish running a certain distance, the number of breaks that the user takes within a certain distance, among other types of performance metrics.

As described above, the adaptive engagement module 124 initially determines that the performance criteria for the program is to increase the user's adherence to program criteria. This is determined based on the program objective to prepare the user to train to achieve a physical state that enables him/her to complete the marathon. A secondary program objective may be to help the user achieve a specific time for completing the marathon.

The adaptive engagement model 124 then periodically monitors the user activity and performance on the program, and selects communications to improve user engagement based on the monitored user activity and performance. For instance, as described above, the adaptive engagement module 124 determines a set of responsiveness scores based on the monitored user activity and performance, and then selects a communication that includes a content type and communication type with the highest responsiveness scores.

With respect to the communication 410a, the adaptive engagement module 124 determines that, because the prior performance indicates deficient performance relative to the target performance (e.g., +15 minutes per running exercise) and that the user is repeatedly stopping during exercises, the user may be using improper running form and techniques that are likely the cause of increased fatigue. This determination is also supported by the indication that the user has only been enrolled in the program for two days, indicating that he/she may not be familiar with proper running techniques (her demographic indicates no history of performance running). In this example, the adaptive engagement module 124 determines that the most appropriate communication to provide for output is a video that explains the best running techniques for marathon runners. This determination is based on the responsiveness score for video content being the highest (e.g., the most instructive relative to other types of content), and the responsiveness for encouragement being the highest (e.g., to motivate the user to stay on track with the program guidelines).

With respect to the communication 410b, the adaptive engagement module 124 determines that, because the user's performance exceeds the target performance of the program, the user is performing exceptionally well compared to the expected performance for a user at the particular period of the program. In this example, the adaptive engagement module 124 determines that the most appropriate communication to provide for output is a challenge message that pushes the user to improve even further to maximize his/her outcome from the program. This determination may also be based on comparing the performance of the user to other users who are co-enrolled into the program (e.g., friends and/or co-workers participating in the same marathon). In response, the adaptive engagement module 124 transmits a text-based communication that challenges the user to outperform his/her current performance in an effort to further improve the user's performance in the program.

With respect to the communication 410c, the adaptive engagement module 124 determines that, because the user has not participated in any exercises in an extended period of time and has reduced the overall level of interactions on the application, the user may likely to be feeling discouraged about his/her physical ability to complete the marathon. In this example, the adaptive engagement module 124 determines that the most appropriate communication to provide for output is one that reassures the user's mental state and requests feedback to improve the user's level of interactivity to try to get the user back on track. Thus, the adaptive engagement module 124 transmits a user survey that requests the user to complete a set of questions that are related to an anxiety assessment. This allows the program to gather additional information related to the user's present mental state, which can subsequently be used as user input data and/or context data in a subsequent adaptive engagement adjustment operation.

Figure 5:
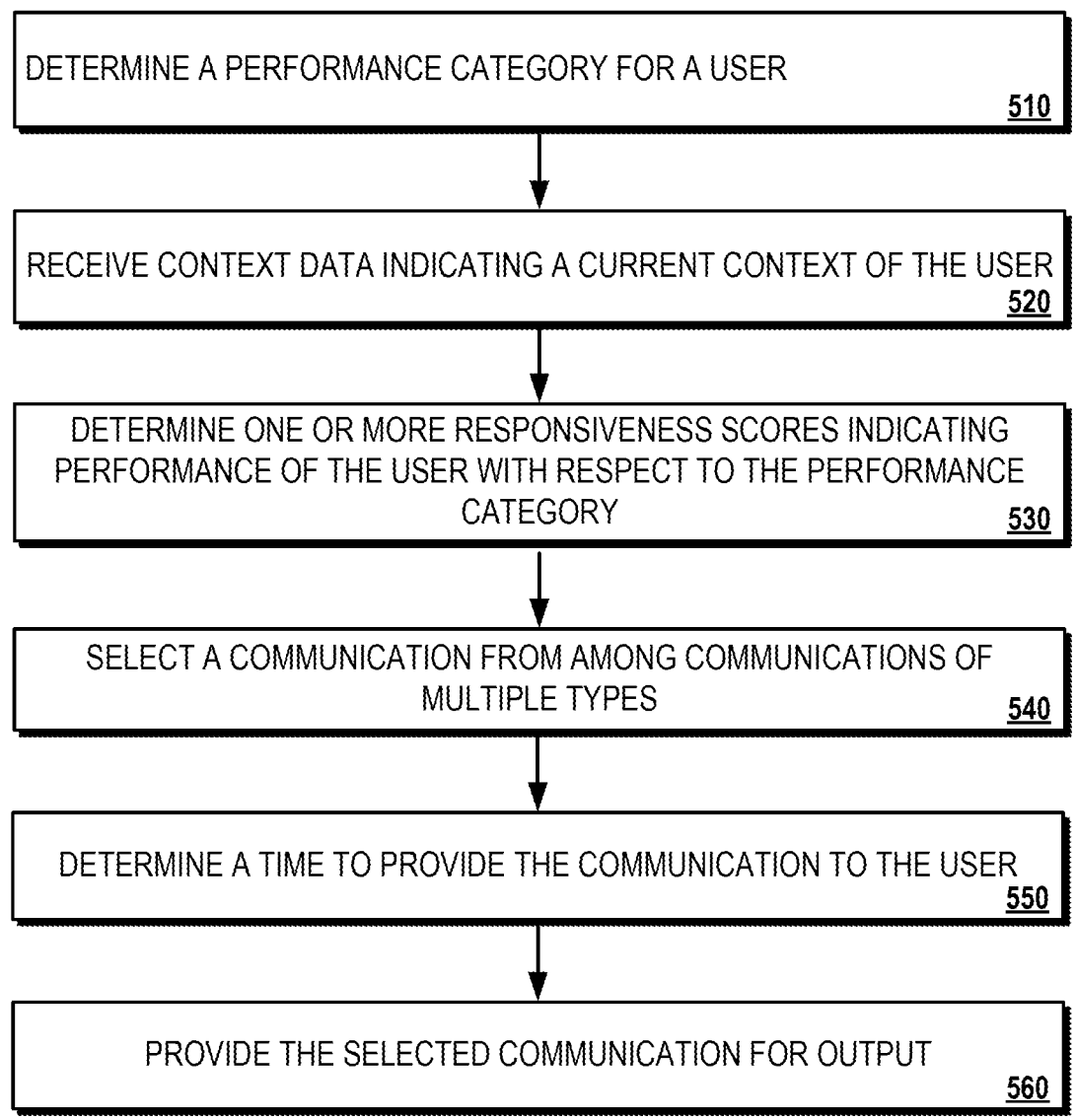
FIG. 5 is a diagram that illustrates a process for adaptively performing personalized engagement.

FIG. 5 is a diagram that illustrates a process 500 for adaptively performing personalized engagement. In some implementations, the process is performed by one or more computers of a server system, such as server 120 discussed above. In some implementations, the process 500 is performed by a user device, such as client device 110. For example, a user device, such as a mobile phone, a tablet computer, a laptop computer, a desktop computer, or a wearable electronic device such as a watch, may obtain software that permits the user device to generate responsiveness scores and generate appropriate communications for a user. The user device may obtain the software that causes the user device to perform the process in any of a variety of ways, such as downloading an application, downloading a module of an existing application, obtaining a web page or code of an Internet resource, or through communication of an application with a server system.

Briefly, the process 500 may include determining a performance category for a user of an application (510), receiving context data indicating a current context of the user (520), determining one or more responsiveness scores indicating performance of the user with respect to the performance category (530), selecting a communication from among communications of multiple types (540), determining a time to provide the communication to the user (550), and providing the selected communication for output (560).

In more detail, the process 500 may include determining a performance category for a user of an application (510). For instance, the adaptive engagement module 124 may identify a performance category for which performance is tracked for the user 102 on the application 112. As discussed above, the identified performance category relates to a particular aspect of user performance which is evaluated to improve the engagement between the user 102 and the application 112.

The process 500 can include receiving context data indicating a current context of the user (520). For instance, the server 120 may receive the context data 104b indicating a current context of the user 102 from the client device 110. In some instances, the received context data 104b can include, for example, a location associated with the client device 110, user activity on other applications besides the application 112 on the client device 110, and/or other data associated with the user that indicates an interest of the user 102 (e.g., recent search results, voice queries submitted, etc.).

The process 500 can include determining one or more responsiveness scores indicating actions of the user with respect to the performance category (530). For instance, the adaptive engagement module 124 computes responsiveness scores with respect to the identified performance category following previous user communications through the application 112. For example, the adaptive engagement module 124 may access the user interaction logs 122a, which include mappings between a prior user context, a previously selected communication that was provided to the user when he/she was in the prior user context, and a user response to the previously selected communication. The adaptive engagement module 124 may analyze the prior responses of the user to determine whether the previously submitted communication was responsive. This can be determined based on measuring, for example, the type of response provided by the user, the number of follow-up queries submitted by the user, time period for user response to the previously submitted communication, among others. The adaptive engagement module 124 then uses this analysis of prior communications to compute a responsiveness score that predicts the response of the user to a set of candidate communications.

The process 500 can include selecting a communication from among communications of multiple types (540). For instance, the adaptive engagement module 124 may select a communication based on the received context data 104b for the user 102 and the one or more responsiveness scores. In some instances, responsiveness scores can be calculated for different content types (e.g., video content, text content, audible output, etc.) and different interaction types (e.g., encouragement, reassurance, user challenge, user survey, etc.). The adaptive engagement module 124 then identified the particular content type and the particular interaction type with the greatest responsiveness score and then selects a communication based on the identified content type and interaction type. In this regard, the received context data 104b and the values of the responsiveness scores are used to select the most appropriate communication that has the greatest likelihood of increasing the engagement between the user 102 and the application 112.

The process 500 can include determining a time to provide the communication to the user (550). For instance, the adaptive engagement module 124 may determine a time to provide the selected communication based on the current context indicated by the context data 104b of the user 102b. As described above, in some instances, the current context may indicate that the user 102 is present unavailable (e.g., being at work), which reduces the likelihood that the communication will cause an increase in the engagement between the user 102 and the application 112. In such instances, the adaptive engagement module 124 may determine a more appropriate time to provide the communication based on a predicted availability of the user (e.g., determining to provide the communication at 6 PM when the user 102 is likely to be home from work). In other instances, the adaptive engagement module 124 may also consider the next time when the user 102 is likely to be in the current context indicated by the context data 104b (e.g., the following day at work). In such instances, the communication can be provided as a context-specific reminder when the user 102 is determined to be within a particular context.

The process 500 can include providing the selected communication for output (560). For instance, the server 120 can provide the selected communication for output to the client device 110 as the communication instruction 126. As discussed previously, the communication instruction 126 can include specify a content type to provide for output, and an interaction type that adjusts the language and/or technique in which the content type is provided to the user. The communication instruction 126 can also include an identified time to provide the communication for output.

As noted above, while the process 500 is described with examples involving both server 120 and client device 120, the process may additionally or alternatively be done by a user device, such as the client device 120 alone. Of course, when performing the process 500, a user device may optionally communicate with other devices, including remote server systems over a network, to obtain information used in the process. For example, a user device may query a server system for information regarding a log of user actions, prior responsiveness scores, content options for communications, and so on, and use the received information in generating personalized communications.

Figure 6:
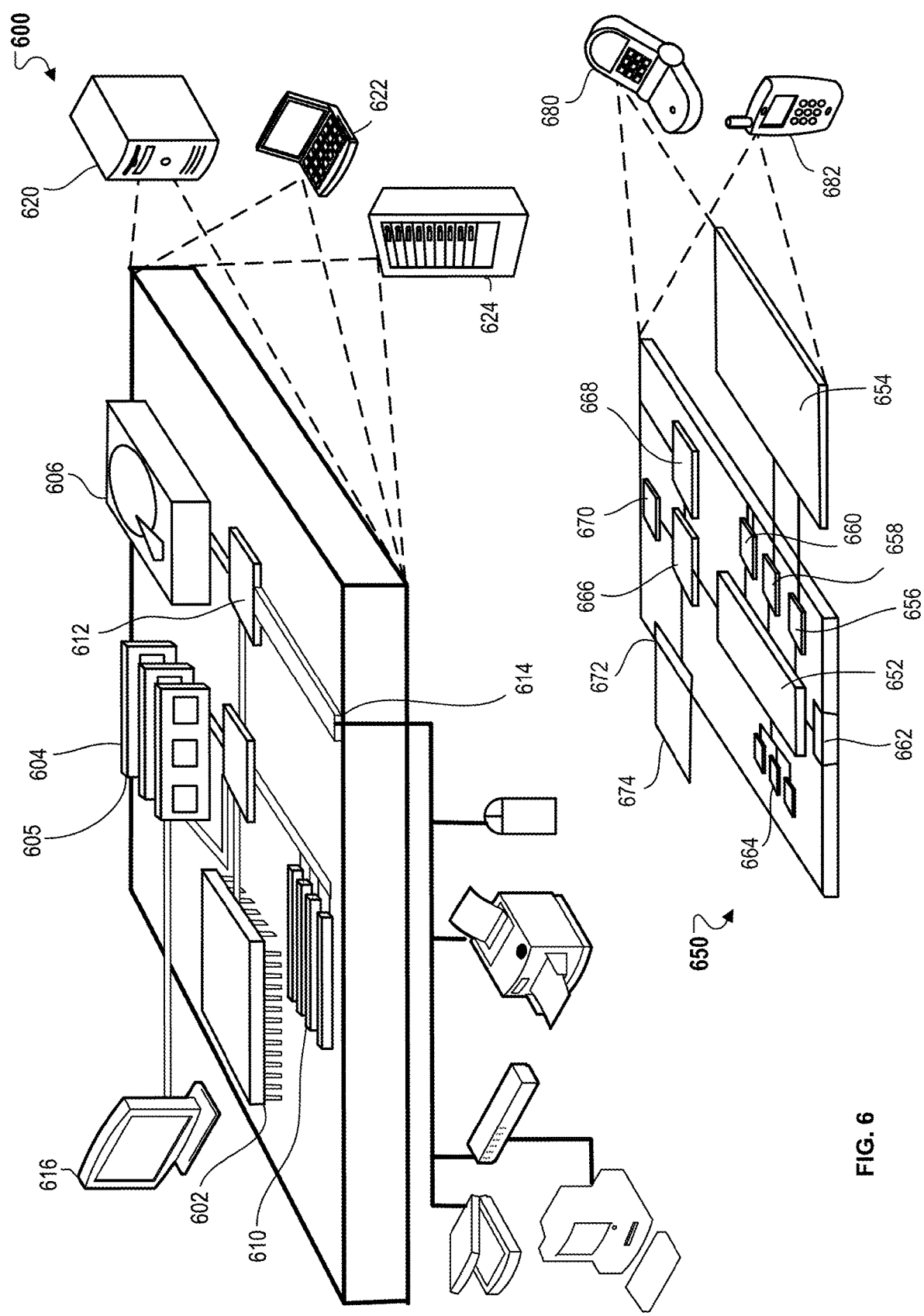
FIG. 6 is a block diagram of computing devices on which the processes described herein, or portions thereof, can be implemented.

FIG. 6 is a block diagram of computing devices 600, 650 that can be used to implement the systems and methods described in this document, as either a client or as a server or plurality of servers. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smartphones, and other similar computing devices. Additionally, computing device 600 or 650 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and can be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses can be used, as appropriate, along with multiple memories and types of memory. Also, multiple computing devices 600 can be connected, with each device providing portions of the necessary operations, e.g., as a server bank, a group of blade servers, or a multi-processor system.

The memory 604 stores information within the computing device 600. In one implementation, the memory 604 is a volatile memory unit or units. In another implementation, the memory 604 is a non-volatile memory unit or units. The memory 604 can also be another form of computer-readable medium, such as a magnetic or optical disk.

The storage device 606 is capable of providing mass storage for the computing device 600. In one implementation, the storage device 606 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth intensive operations. Such allocation of functions is exemplary only. In one implementation, the high-speed controller 608 is coupled to memory 604, display 616, e.g., through a graphics processor or accelerator, and to high-speed expansion ports 610, which can accept various expansion cards (not shown). In the implementation, low-speed controller 612 is coupled to storage device 606 and low-speed expansion port 614. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 600 can be implemented in a number of different forms, as shown in the figure. For example, it can be implemented as a standard server 620, or multiple times in a group of such servers. It can also be implemented as part of a rack server system 624. In addition, it can be implemented in a personal computer such as a laptop computer 622. Alternatively, components from computing device 600 can be combined with other components in a mobile device (not shown), such as device 650. Each of such devices can contain one or more of computing device 600, 650, and an entire system can be made up of multiple computing devices 600, 650 communicating with each other.

The computing device 600 can be implemented in a number of different forms, as shown in the figure. For example, it can be implemented as a standard server 620, or multiple times in a group of such servers. It can also be implemented as part of a rack server system 624. In addition, it can be implemented in a personal computer such as a laptop computer 622. Alternatively, components from computing device 600 can be combined with other components in a mobile device (not shown), such as device 650. Each of such devices can contain one or more of computing device 600, 650, and an entire system can be made up of multiple computing devices 600, 650 communicating with each other.

Computing device 650 includes a processor 652, memory 664, and an input/output device such as a display 654, a communication interface 666, and a transceiver 668, among other components. The device 650 can also be provided with a storage device, such as a microdrive or other device, to provide additional storage. Each of the components 650, 652, 664, 654, 666, and 668, are interconnected using various buses, and several of the components can be mounted on a common motherboard or in other manners as appropriate.

The processor 652 can execute instructions within the computing device 650, including instructions stored in the memory 664. The processor can be implemented as a chipset of chips that include separate and multiple analog and digital processors. Additionally, the processor can be implemented using any of a number of architectures. For example, the processor 610 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 650, such as control of user interfaces, applications run by device 650, and wireless communication by device 650.

Processor 652 can communicate with a user through control interface 658 and display interface 656 coupled to a display 654. The display 654 can be, for example, a TFT (Thin-Film-Transistor Liquid Crystal Display) display or an OLED (Organic Light Emitting Diode) display, or other appropriate display technology. The display interface 656 can comprise appropriate circuitry for driving the display 654 to present graphical and other information to a user. The control interface 658 can receive commands from a user and convert them for submission to the processor 652. In addition, an external interface 662 can be provide in communication with processor 652, so as to enable near area communication of device 650 with other devices. External interface 662 can provide, for example, for wired communication in some implementations, or for wireless communication in other implementations, and multiple interfaces can also be used.

The memory 664 stores information within the computing device 650. The memory 664 can be implemented as one or more of a computer-readable medium or media, a volatile memory unit or units, or a non-volatile memory unit or units. Expansion memory 664 can also be provided and connected to device 650 through expansion interface 662, which can include, for example, a SIMM (Single In Line Memory Module) card interface. Such expansion memory 664 can provide extra storage space for device 650, or can also store applications or other information for device 650. Specifically, expansion memory 664 can include instructions to carry out or supplement the processes described above, and can include secure information also. Thus, for example, expansion memory 664 can be provide as a security module for device 650, and can be programmed with instructions that permit secure use of device 650. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 664, or memory on processor 652 that can be received, for example, over transceiver 668 or external interface 662.

Device 650 can communicate wirelessly through communication interface 666, which can include digital signal processing circuitry where necessary. Communication interface 666 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 668. In addition, short-range communication can occur, such as using a Bluetooth, Wi-Fi, or other such transceiver (not shown). In addition, GPS (Global Positioning System) receiver module 660 can provide additional navigation- and location-related wireless data to device 650, which can be used as appropriate by applications running on device 650.

Device 650 can also communicate audibly using audio codec 660, which can receive spoken information from a user and convert it to usable digital information. Audio codec 660 can likewise generate audible sound for a user, such as through a speaker, e.g., in a handset of device 650. Such sound can include sound from voice telephone calls, can include recorded sound, e.g., voice messages, music files, etc. and can also include sound generated by applications operating on device 650.

The computing device 650 can be implemented in a number of different forms, as shown in the figure. For example, it can be implemented as a cellular telephone 480. It can also be implemented as part of a smartphone 682, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube)

or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method performed by one or more computers, the method comprising:
   generating, by the one or more computers, monitoring data for a user indicating performance of the user over time, the monitoring data indicating actions that a user performed after being provided communications in different contexts;
   evaluating, by the one or more computers, the monitoring data for the user to identify effects that the respective contexts in which messages were provided had on performance of the user, including determining, for each of the different contexts, a relationship between the context and the performance of the user indicated in the monitoring data, the relationship for the context being determined based on (i) one or more of the communications that were provided to the user when the user was in the context and (ii) performance of the user after the one or more of the communications were provided when the user was in the context;
   receiving, by the one or more computers and from a client device associated with the user, context data indicating a current context of the user, wherein the context data indicates at least one of a location of the user, an activity of the user, or an availability of the user to interact with the client device;
   customizing, by the one or more computers, one or more communications to the user based on (i) the context data for the user and (ii) the relationships, determined based on the monitoring data for the user, between the contexts of the communications that were provided to the user and performance of the user indicated by the monitoring data for the user; and
   providing, by the one or more computers, the one or more customized communications for output by the client device.

2. The method of claim 1, wherein customizing the one or more communications to the user comprises:
   selecting a type of content to be included within the one or more customized communications; and
   selecting a type of user interaction to be specified by the one or more customized communications.

3. The method of claim 1, wherein customizing the one or more communications to the user comprises adjusting a manner of communicating with the user by selecting, from among communications of multiple types, a communication based on the context data for the user and the results of the evaluation.

4. The method of claim 1, wherein the monitoring data indicates levels of responsiveness of the user to one or more prior communications that were provided when the user was in one of the different contexts.

5. The method of claim 1, wherein the performance of the user comprises physical activity performed by the user that is related to a fitness goal for the user.

6. The method of claim 5, wherein:
   evaluating the monitoring data comprises determining that actions performed by the user indicate that the user has not adhered to the fitness goal;
   the current context indicates that the user is not presently available to interact with the client device; and
   customizing the one or more communications to the user comprises selecting, from among communications of different types, a text message to provide for output by the client device, wherein the text message comprises content that is predicted to encourage the user to improve adherence to the fitness goal.

7. The method of claim 5, wherein:
   evaluating the monitoring data comprises determining that the actions performed by the user indicate that the user has not adhered to the fitness goal;
   the current context indicates that the user is presently available to interact with the client device; and
   customizing the one or more communications to the user comprises selecting, from among communications of different types, a video message to provide for output by the client device, wherein the video message comprises content that is predicted to encourage the user to improve adherence to the fitness goal.

8. The method of claim 1, wherein the performance of the user comprises following a treatment plan for the user.

9. The method of claim 1, wherein the performance of the user comprises the user taking one or more actions separate from interaction with the client device of the user.

10. The method of claim 1, wherein the evaluating the monitoring data comprises:
    identifying actions that were performed by the user after one or more previous communications to the user;
    identifying contexts of the user when the previous communications were provided; and
    determining relationships between the identified actions that were performed by the user after the one or more previous communications and the identified contexts of the user when the previous communications were provided.

11. The method of claim 1, wherein providing the one or more customized communications for output by the client device comprises:
   determining a time to provide the one or more customized communications for output; and
   providing the one or more customized communications for output by the client device at the determined time.

12. The method of claim 1, wherein:
   the performance of the user over time corresponds to a performance category for which performance is tracked for the user; and
   the monitoring data is evaluated based on determining whether the actions that the user performed after being provided communications in different contexts includes one or more actions that are related to the performance category.

13. The method of claim 12, wherein evaluating the monitoring data comprises:
   obtaining historical context data indicating a prior context of the user;
   identifying prior actions of the user with respect to the performance category when the user was determined to be in the prior context;
   determining a prior performance of the user with respect to the performance category;
   determining that the prior context corresponds to the current context; and
   determining performance of the user with respect to the performance category when the user is in the current context based on the prior performance of the user and that the prior context corresponding to the current context.

14. A system comprising:
   one or more computing devices; and
   one or more storage devices storing instructions that, when received by the one or more computing devices, cause the one or more computing devices to perform operations comprising:
      generating, by the one or more computers, monitoring data for a user indicating performance of the user over time, the monitoring data indicating actions that a user performed after being provided communications in different contexts;
      evaluating, by the one or more computers, the monitoring data for the user to identify effects that the respective contexts in which messages were provided had on performance of the user, including determining, for each of the different contexts, a relationship between the context and the performance of the user indicated in the monitoring data, the relationship for the context being determined based on (i) one or more of the communications that were provided to the user when the user was in the context and (ii) performance of the user after the one or more of the communications were provided when the user was in the context;
      receiving, by the one or more computers and from a client device associated with the user, context data indicating a current context of the user, wherein the context data indicates at least one of a location of the user, an activity of the user, or an availability of the user to interact with the client device;
      customizing, by the one or more computers, one or more communications to the user based on (i) the context data for the user and (ii) the relationships, determined based on the monitoring data for the user, between the contexts of the communications that were provided to the user and performance of the user indicated by the monitoring data for the user; and
      providing, by the one or more computers, the one or more customized communications for output by the client device.

15. The system of claim 14, wherein customizing the one or more communications for the user comprises:
   selecting a type of content to be included within the one or more customized communications; and
   selecting a type of user interaction to be specified by the one or more customized communications.

16. The system of claim 14, wherein the performance of the user over time indicates actions performed by the user corresponding to a fitness goal specified by a healthcare program.

17. The system of claim 16, wherein:
   evaluating the monitoring data comprises determining that actions performed by the user indicate that the user has not adhered to the fitness goal;
   the current context indicates that the user is not presently available to interact with the client device; and
   customizing the one or more communications to the user comprises selecting, from among communications of different types, a text message to provide for output by the client device, wherein the text message comprises content that is predicted to encourage the user to improve adherence to the fitness goal.

18. At least one non-transitory computer-readable storage device storing instructions that, when executed by one or more computing devices, cause the one or more computing devices to perform operations comprising:
   generating, by the one or more computers, monitoring data for a user indicating performance of the user over time, the monitoring data indicating actions that a user performed after being provided communications in different contexts;
   evaluating, by the one or more computers, the monitoring data for the user to identify effects that the respective contexts in which messages were provided had on performance of the user, including determining, for each of the different contexts, a relationship between the context and the performance of the user indicated in the monitoring data, the relationship for the context being determined based on (i) one or more of the communications that were provided to the user when the user was in the context and (ii) performance of the user after the one or more of the communications were provided when the user was in the context;
   receiving, by the one or more computers and from a client device associated with the user, context data indicating a current context of the user, wherein the context data indicates at least one of a location of the user, an activity of the user, or an availability of the user to interact with the client device;
   customizing, by the one or more computers, one or more communications to the user based on (i) the context data for the user and (ii) the relationships, determined based on the monitoring data for the user, between the contexts of the communications that were provided to the user and performance of the user indicated by the monitoring data for the user; and
   providing, by the one or more computers, the one or more customized communications for output by the client device.

19. The non-transitory computer-readable storage device of claim 18, wherein customizing the one or more communications for the user comprises:
   selecting a type of content to be included within the one or more customized communications; and
   selecting a type of user interaction to be specified by the one or more customized communications.

20. The non-transitory computer-readable storage device of claim 18, wherein customizing the one or more communications for the user comprises adjusting a manner of communicating with the user by selecting, from among communications of multiple types, a communication based on the context data for the user and the results of the evaluation.

21. The method of claim 1, wherein determining the relationship for each of the different contexts comprises:
   for at a particular context of the different contexts, determining the relationship based on (i) a plurality of communications that were provided to the user in the particular context at different times and (ii) measures of performance of the user after the respective communications in the plurality of communications were provided to the user in the particular context.

\* \* \* \* \*

UNITED STATES PATENT AND TRADEMARK OFFICE
CERTIFICATE OF CORRECTION

| | |
|---|---|
| PATENT NO. | : 11,595,498 B2 |
| APPLICATION NO. | : 17/092842 |
| DATED | : February 28, 2023 |
| INVENTOR(S) | : Praduman Jain et al. |

It is certified that error appears in the above-identified patent and that said Letters Patent is hereby corrected as shown below:

On the Title Page (Title), and in the Specification, Column 1, Line 1, Delete "DATA-DRIVEN ADAPTATION OF" and insert -- CUSTOMIZING --.

Signed and Sealed this
Eighteenth Day of April, 2023

Katherine Kelly Vidal
*Director of the United States Patent and Trademark Office*